Sept. 17, 1957  H. O. SCHERENBERG ET AL  2,806,714
WHEEL SUSPENSION FOR AUTOMOBILES WITH SWINGING HALF-AXLES
Filed April 11, 1955  2 Sheets-Sheet 1

INVENTORS
HANS O. SCHERENBERG
AND JOSEF MÜLLER
BY  Dicke and Craig.
ATTORNEYS.

Sept. 17, 1957     H. O. SCHERENBERG ET AL     2,806,714
WHEEL SUSPENSION FOR AUTOMOBILES WITH SWINGING HALF-AXLES
Filed April 11, 1955     2 Sheets-Sheet 2

INVENTORS
HANS O. SCHERENBERG
AND JOSEF MÜLLER
BY Dicke and Craig
ATTORNEYS.

United States Patent Office 2,806,714
Patented Sept. 17, 1957

2,806,714

WHEEL SUSPENSION FOR AUTOMOBILES WITH SWINGING HALF-AXLES

Hans O. Scherenberg, Stuttgart-Heumaden, and Josef Muller, Stuttgart, Germany, assignors to Daimler-Benz Aktiengesellschaft, Stuttgart-Unterturkheim, Germany Application April 11, 1955, Serial No. 500,578

Claims priority, application Germany April 15, 1954

13 Claims. (Cl. 280—124)

The present invention relates to a wheel suspension for automobiles and similar vehicles having oscillating half-axles which are pivotally mounted, particularly by hinge joints, on an axle carrier or mounting which, in turn, is resiliently mounted on the car body, and which are preferably supported relative to the car frame in the longitudinal direction thereof by means of thrust arms which are pivotally mounted on the oscillating half-axles.

It is one of the objects of the present invention to transmit the forces from the wheels to the car body with the least possible stresses upon the axle carrier and the car body.

It is another object of the present invention to take up especially the shocks and vibrations transmitted from the wheels to the half-axles in a direction transverse to the driving direction and as resiliently and softly as possible.

It is a further object of the present invention to make the axle carrier relatively resilient in a direction transverse to the driving direction but at the same time to limit such resilience elastically against very severe shocks.

Another object of the present invention is to improve the ability of a car to hug the road by means of relatively simple means, and to provide an axle suspension of a design and construction so as to prevent the wheels from changing their alignment when they are resiliently deflected in driving over rough roads or in curves.

Further objects of the present invention relate particularly to a very suitable design and construction of the axle carrier so as to obtain the proper resilience transverse to the driving direction and for taking up the driving and braking forces with the largest possible leverage by means of an axle carrier extending in a vertical direction, and further to an advantageous design and arrangement of the rubber cushions required for such purpose, and to the means for supporting and taking up the transversely directed forces, and for limiting the resilience in a transverse direction.

Further objects, features, and advantages of the present invention will appear from the following detailed description of one specific embodiment of the invention and the accompanying drawings thereof, in which Fig. 1 shows a front view of a rear axle of an automobile partly in a section taken along line 1—1 of Fig. 2;

Fig. 5 shows a view, on an enlarged scale and partly in section, of the thrust arm shown in Fig. 1 which laterally supports the axle carrier; while

Figure 1:
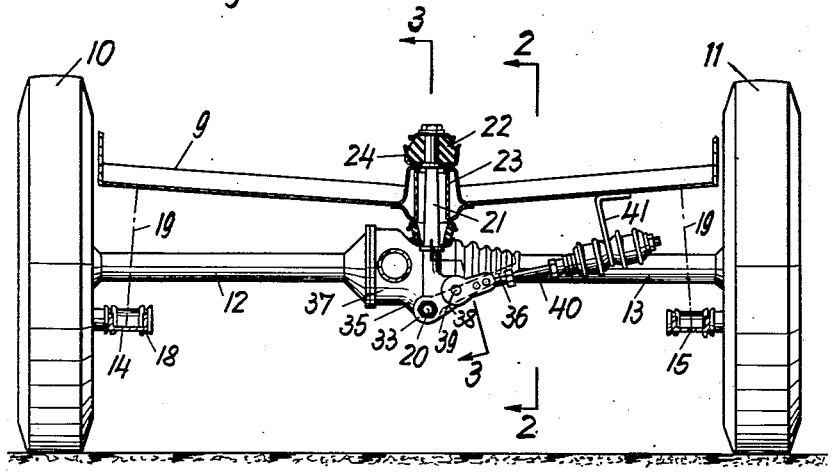
Figure 2:
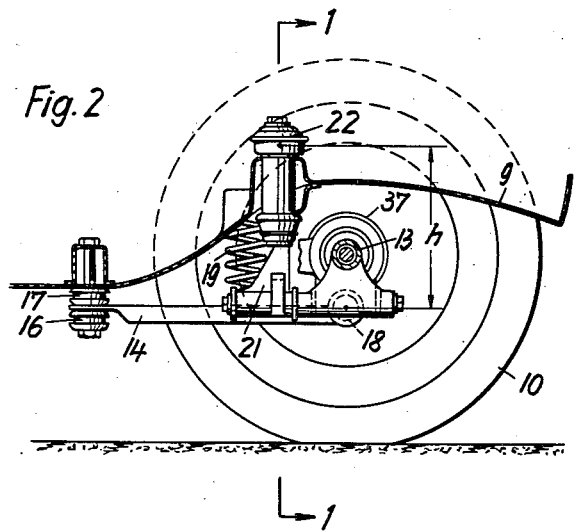
Fig. 2 shows a side view of the axle, partly in a section taken along a line 2—2 of Fig. 1.
Figure 3:
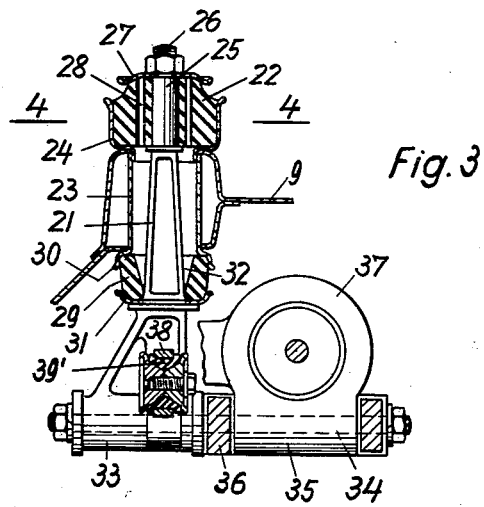
Fig. 3 shows a cross section on an enlarged scale taken along line 3—3 of Fig. 1, such section, however, not extending through the transmission housing.
Figure 4:
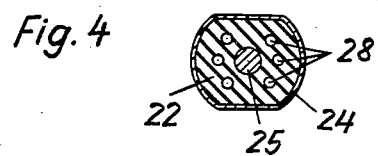
Fig. 4 shows a cross section taken along line 4—4 of Fig. 3.
Figure 5:
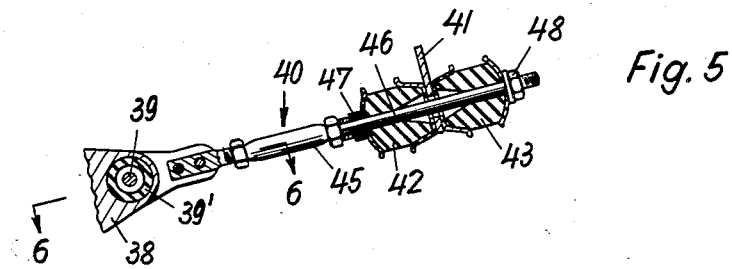
Figure 6:
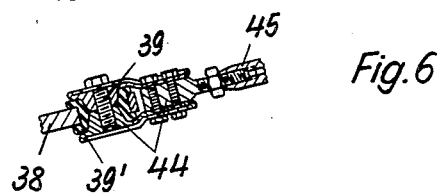
Fig. 6 shows a longitudinal section taken along line 6—6 of Fig. 5.

Referring to the drawings and first particularly to Figs. 1 and 2, the rear wheels 10 and 11 of a car are rotatably mounted on oscillating half-axles 12 and 13 and also supported relative to the car body 9, for example, by U-shaped thrust arms 14 and 15. These thrust arms or bars 14 and 15 may be mounted on the car body so as to be resilient in all directions, for example, by a pair of rubber cushions 16 and 17 on each side, and they may be resiliently connected to the half-axles 12 and 13, for example, by means of a rubber sleeve 18 so that the thrust arms or bars 14 and 15 can follow the movements of the oscillating half-axles 12 and 13 when the wheels are being deflected when driving over rough roads or in curves. Coil springs 19, the lower ends of which rest upon the thrust bars 14 and 15, respectively, are connected to the wheels 10 and 11 in any suitable manner for resiliently supporting the same.

The oscillating half-axles 12 and 13 are both pivotally mounted on the axle carrier 21 by means of the same pivot 20. The axle carrier 21 forms a substantially vertical journal-like element which extends through a socket-like portion 23 of the frame or body 9 of the car and is mounted at its upper end on the car body so as to be resiliently supported in all directions by passing through an annular rubber cushion 22 which is encased in a socket 24 and topped by a washer 27, both of sheet metal. The rubber cushion 22 may be provided with apertures, channels, or the like 28, which give the cushion a particularly soft resilience in the longitudinal direction of the car, or about a horizontal transverse axis thereof.

For taking up any upwardly directed shocks, an additional rubber ring 29 is interposed between cuplike washers 30 and 31. This ring 29 is made of a size and shape so as to have a certain radial play 32 relative to the axle-carrying shaft 21. Thus, the rubber ring 29 does not restrict the movement of the axle carrier 21 in a lateral direction and the latter is able to swing freely about its upper joint formed by the rubber cushion 22. Both rubber cushions 22 and 29 are held under axial tension by the nut 26 which is screwed on the upper journal end 25 of the vertical axle carrier 21 and thus secures the latter to the car body.

At its lower end, the axle carrier 21 includes a horizontal bearing 33 forming the pivot 20, as shown in Fig. 1, and carrying at one side on a journal 34 the two half-axles 12 and 13 which are mounted by means of arms 35 and 36 on the journal 34.

As shown particularly in Fig. 1, the half-axle 12 also includes the transmission housing 37 which thus swings together therewith about the pivot 20.

For taking up the lateral forces acting upon the axle carrier, the lower bearing 33 thereof is provided with an extension 38, on which a transverse or diagonal arm 40 is pivotally mounted by means of a pivot pin 39 which is enclosed by a rubber cushion 39'. The other end of the arm 40 facing away from the axle carrier 21 is a connected to a bracket 41 mounted on the car body by means of rubber cushions 42 and 43 acting upon the opposite sides of the bracket 41'. The bifurcated member 44 consisting of several parts and forming the joint in which the pivot pin 39 is mounted is connected to a rod 46 by a turnbuckle 45 having right and left-hand threads at its opposite ends so as to permit an adjustment of its length. The rod 46 carries the rubber cushions 42 and 43 intermediate cuplike washers which may thus be placed under a suitable tension by the adjustment of nuts 47 and 48.

When seen in a side view as shown particularly in Fig. 2, the axle suspension according to the invention comprising the axle carrier 21, the half-axles 12 and 13, and the thrust arms 14 and 15, forms a triangular system, the apices of which are formed by the resilient joints 22, 18, and 16 and 17. If one of the wheels swings upwardly or downwardly, the joint 18 pivots, on the one hand, about the joint 16, 17 of the thrust arm 14 which is mounted on the car frame or body and, on the other hand, about the joint 20 which connects the respective half-axle 12 or 13 with the axle carrier 21. However, since the half-axles 12 and 13 are connected by pivotal joints with the axle carrier 21 which is designed as a vertical journal, and thus in a longitudinal direction of the car form a rigid system, the axle carrier 21 also participates in the oscillating movement of the wheel about the joint 16, 17 of the thrust arm 14. If only one wheel thus oscillates, it will incline only very slightly relative to the driving direction of the car since the entire suspension unit will operate as a lever which swings about the pivotal point of the opposite thrust arm.

The driving and braking forces will be taken up, on the one hand, by the thrust arm 14 or 15, respectively, and, on the other hand, by the upper resilient joint 22 of the axle carrier 21, and these forces will be reduced in reverse proportion to the vertical distance $h$ between the joints 22 and 18, as shown in Fig. 2. Since axle carrier 21 is designed in the form of a vertical journal, it is possible to make this distance $h$ quite large and thus to reduce these forces considerably.

The high resilience of the rubber cushions 22 permits the half-axles together with the thrust arms 14 and 15 to swing almost without restriction. The transverse forces which might be occurring are then transmitted to the frame or body of the car by the diagonal arm 40.

Although our invention has been illustrated and described with reference to the preferred embodiments thereof we wish to have it understood that it is in no way limited to the details of such embodiments or to the specific examples described, but is capable of numerous modifications within the scope of the appended claims.

Having thus fully disclosed our invention, what we claim is:

1. In an automobile having a car body, the combination of a pair of pivotable half-axles extending in a direction transverse to the longitudinal axis of the car, a wheel mounted on the outer end of each of said half-axles, a single axle carrier extending substantially vertically and adjacent to the central vertical longitudinal plane of said car, first resilient means for resiliently mounting the upper end of the axle carrier on the car body so as to permit said axle carrier to yield about a horizontal longitudinal axis of said car extending through a point adjacent the upper end of said axle carrier, second resilient means for resiliently mounting said axle carrier and for limiting the resilience thereof essentially in the direction of the axis of said axle carrier while enabling the lower end of said axle carrier to yield considerably in a transverse direction of said car, and means for pivotally mounting the inner ends of said half-axles on said axle carrier within a plane below the axis of said wheels.

2. In an automobile as defined in claim 1, wherein the pivotal axes of the last-mentioned means of both half-axles coincide with each other.

3. In an automobile as defined in claim 1, wherein the last-mentioned means comprise hinge joints for said half-axles, said combination further comprising a pair of thrust arms extending in the longitudinal direction of said car, and means for connecting each of said thrust arms to one of said half-axles as well as to said car body.

4. In an automobile as defined in claim 3, wherein said thrust arms are located within a plane below the axes of said wheels.

5. In an automobile as defined in claim 1, wherein said first resilient means comprise a rubber cushion and means for maintaining said cushion in a substantially horizontal position and under an initial tension, said second resilient means comprising a rubber cushion, said last cushion being adapted to yield substantially freely in a substantially horizontal direction.

6. In an automobile having a car body, the combination of a pair of pivotable half-axles extending in a direction transverse to the longitudinal axis of the car, a wheel mounted on the outer end of each of said half-axles, an axle carrier extending substantially vertically and adjacent to the central vertical longitudinal plane of said car and at least partly forming a substantially vertical journal, an annular rubber cushion for resiliently mounting the upper portion of said axle carrier on said car body so as to permit said axle carrier to yield about a substantially horizontal longitudinal axis of said car extending through said upper portion of said axle carrier, a second annular rubber cushion for resiliently supporting said axle carrier and for limiting the resilience thereof about said longitudinal axis, said second rubber ring being adapted to permit the lower end of said axle carrier to yield relatively freely in a transverse direction of said car, and means for pivotally mounting the inner ends of said half-axles on said axle carrier at the lower portion thereof.

7. In an automobile as defined in claim 6, wherein said first rubber cushion has recesses therein adapted to increase the resilience thereof in the longitudinal and transverse directions of said car.

8. In an automobile as defined in claim 6, said combination further comprising means connected to said car body, said means including a first element enclosing said first annular rubber cushion and solidly clamping the same in a radial direction intermediate said element and said axle carrier and a second element connected to said car body and supporting said first rubber cushion in the axial direction from the bottom thereof, a third element connected to said axle carrier and supporting said first rubber cushion in axial direction from the top thereof, a fourth element connected to said car body and supporting said second annular rubber cushion in the axial direction from the top thereof, a fifth element connected to said axle carrier and supporting said second rubber cushion in the axial direction from the bottom thereof, said second cushion being adapted to yield substantially freely in a radial direction thereof, and means for axially clamping said rubber cushions between said third and fifth elements connected to said axle carrier and for tensioning the same.

9. In an automobile as defined in claim 6, said combination further comprising a bracing member and resilient means for connecting said bracing member near one end to said axle carrier and near the other end to said car body, and extending substantially in transverse direction of said car.

10. In an automobile as defined in claim 9, wherein said last resilient means of said bracing member comprises two rubber cushions abutting from opposite sides, on the one hand, against one of the parts comprising said axle carrier and said car body, and, on the other hand, from opposite sides against said bracing member, and means for clamping said two rubber cushions in axial direction between said bracing member and said part.

11. In an automobile as defined in claim 9, said combination further comprising means for adjusting the tension of said resilient means of said bracing member.

12. In an automobile having a car body, the combination of a pair of pivotable half-axles extending in a direction transverse to the longitudinal axis of the car, a wheel mounted on the outer end of each of said half-axles, an axle carrier extending substantially vertically and adjacent to the central vertical longitudinal plane of said car, resilient means for resiliently mounting the upper end of the axle carrier on the car body so as to permit said axle carrier to yield about a horizontal longitudinal axis of said car extending through a point adjacent the upper end of said axle carrier, resilient means for resiliently mounting said axle carrier and for limiting the resilience thereof about its upper end, said last means being adapted to permit the lower end of said axle carrier to yield considerably in a transverse direction of said car, means for pivotally mounting the inner ends of said half-axles on said axle carrier within a plane below the axis of said wheels, and a transmission housing forming a part of one of said half-axles.

13. In an automobile having a car body, the combination of a pair of pivotable half-axles extending in a direction transverse to the longitudinal axis of the car, a wheel mounted on the outer end of each of said half-axles, an axle carrier extending substantially vertically and adjacent to the central vertical longitudinal plane of said car and at least partly forming a substantially vertical journal, an annular rubber cushion for resiliently mounting the upper portion of said axle carrier on said car body so as to permit said axle carrier to yield about a substantially horizontal longitudinal axis of said car extending through said upper portion of said axle carrier, a second annular rubber cushion for resiliently supporting said axle carrier and for limiting the resilience thereof about said longitudinal axis, said second rubber ring being adapted to permit the lower end of said axle carrier to yield relatively freely in a transverse direction of said car, means for pivotally mounting the inner ends of said half-axles on said axle carrier at the lower portion thereof, a bracing member, and means including resilient means for connecting said bracing member to said axle carrier and to said car body, and extending substantially in the transverse direction of said car.

References Cited in the file of this patent

UNITED STATES PATENTS 2,417,214     Roos _____ Mar. 11, 1947

FOREIGN PATENTS 1,063,269     France _____ Dec. 16, 1953